(12) United States Patent
Ray et al.

(10) Patent No.: US 7,031,494 B2
(45) Date of Patent: Apr. 18, 2006

(54) METHOD FOR SECURELY TRANSACTING A TRANSACTION BASED ON A TRANSACTION DOCUMENT

(75) Inventors: Lawrence A. Ray, Rochester, NY (US); Rajan L. Joshi, Pittsford, NY (US); Gene E. Pios, Spencerport, NY (US)

(73) Assignee: Eastman Kodak Company, Rochester, NY (US)

(*) Notice: Subject to any disclaimer, the term of this patent is extended or adjusted under 35 U.S.C. 154(b) by 637 days.

(21) Appl. No.: 10/178,257

(22) Filed: Jun. 24, 2002

(65) Prior Publication Data
US 2003/0235325 A1 Dec. 25, 2003

(51) Int. Cl.
*G06K 9/00* (2006.01)
*H04Q 1/00* (2006.01)

(52) U.S. Cl. ...................... 382/100; 340/5.6
(58) Field of Classification Search ............ 382/100, 382/135, 137, 118, 235; 340/5.26, 5.53, 340/5.6, 5.65, 5.66, 5.8, 5.81, 5.83, 5.86; 283/74, 75, 77, 82, 85; 380/210, 217, 287, 380/22, 51, 55
See application file for complete search history.

(56) References Cited

U.S. PATENT DOCUMENTS

| | | | | |
|---|---|---|---|---|
| 4,972,476 A | * | 11/1990 | Nathans | 380/23 |
| 4,991,205 A | * | 2/1991 | Lemelson | 380/5 |
| 5,799,092 A | * | 8/1998 | Kristol et al. | 380/51 |
| 5,864,622 A | * | 1/1999 | Marcus | 380/23 |
| 5,913,542 A | * | 6/1999 | Belucci et al. | 283/75 |
| 6,292,092 B1 | * | 9/2001 | Chow et al. | 340/5.6 |
| 6,836,554 B1 | * | 12/2004 | Bolle et al. | 382/116 |

OTHER PUBLICATIONS

Serge Lange, *Algebra*, Addison-Wesley Publishing Company, Reading, Massachusetts, 1965, pp. 9-13.
Erik Hjelmas and Boom Kee Low, "Face Detection: A Survey," *Computer Vision and Image Understanding*, vol. 83, No. 3, Sep. 2001, pp. 236-274.
M-S. Yang, D.J. Kreigman, and N. Ahuja, "Detecting Faces in Images: A Survey," *IEEE Transactions in Pattern Analysis and Machine Intelligence*, vol. 24, No. 1, Jan., 2002, pp. 34-58.

* cited by examiner

*Primary Examiner*—Andrew W. Johns
(74) *Attorney, Agent, or Firm*—Peyton C. Watkins (57) ABSTRACT

A method for securely transacting a transaction based on a transaction document having an image contained within the document, the method includes the steps of compressing an image on the document; scrambling the structure of the compressed image according to a permutation; obtaining the inverse permutation; applying the inverse permutation to the scrambled image for obtaining an unscrambled image; and decompressing the unscrambled image.

60 Claims, 8 Drawing Sheets

METHOD FOR SECURELY TRANSACTING A TRANSACTION BASED ON A TRANSACTION DOCUMENT

FIELD OF THE INVENTION

The present invention relates to the field of transaction security and in particular an apparatus and method of cost effectively securing transactions documents, such as credit cards and the like.

BACKGROUND OF THE INVENTION

Documents are used to gain access to a wide variety of services and information. Included among these documents, hereinafter referred to as transaction documents, are credit cards, passports, checks, and drivers licenses. Assuring that authorized people are granted access, while denying others has significant importance in the course of daily commerce. Since these documents can be valuable, there is a great temptation to create forged or fraudulent copies. There are a large number of approaches to produce fraudulent documents, and many do not require forgery, but simply modifying machine-readable data that many of these documents carry. For instance, copying the data from a stolen credit card onto the magnetic stripe of another credit card does not require credit card forgery, but can permit unauthorized use of credit services.

In many cases, access to services requires, not only permission from a person granting services, e.g., a clerk, but also a remote facility. It is common for a credit card purchase to be remotely authorized through an electronic authorization step. A similar process occurs at many establishments for authorizing checks. A large volume of potential fraud is eliminated with these procedures.

There are numerous technologies and features available for documents to reduce the potential of forgery. These include features such as specialized overcoats, directional inks, safety paper, and holograms to name a few. Many of these permit a trained individual to determine readily if a document is forged. However, many people, such as store clerks, are not trained to perform this task. Simple-to-use methods are needed to alert a clerk that a transaction document is likely to be fraudulent. Moreover, the techniques also need to operate quickly, in order not to slow the completion of the transaction, as the vast majority of transactions are legitimate.

The use of portrait style images of the authorized document holder on transaction documents is typical. Portrait images are included on all drivers licenses within the United States and portrait images are part of all passports. Even some credit card issuers offer this feature. Many of these documents have machine-readable areas. For instance, credit cards have a magnetic stripe, some drivers licenses have two-dimensional bar-codes and so-called smart cards have an integrated circuit with memory to name but a few. A compressed image of the authorized cardholder can be stored within these areas. These machine-readable areas all have sufficient data area to store a compressed version of the portrait image of the authorized document holder. Most times, the encoded data is simply used as a means of confirming that the document has not been tampered. If the decoded image matches the image on the document, as well as a strong likeness of the person presenting the transaction document, then the document is accepted.

One aspect of many transaction verification systems is that the network used for remote verifications has many nodes and uses a relatively slow speed communications system. The ability to transmit even moderate amounts of data is unacceptable. Even a modest increase in the data required to perform a remote authorization can have serious ramifications to the overall processing time. Communication between a point of transaction and the remote facility should require a limited amount of data.

A feature of the present invention is the use of permutations. It is well known that, given an ordered list of objects, a permutation is a rearrangement of the ordering. If one considers the set of all possible permutations of n objects, it is well known that the set forms an algebraic structure commonly referred to as a group (see Serge Lang, *Algebra*, Addison-Wesley Publishing Company, Reading, Mass., 1965, pp. 9–13.) Begin with a standard or preferred ordering of the objects, this ordering will be referred to as the identity permutation. When this permutation is applied to the list, the resulting list is identical to the initial list. Suppose $\sigma$ is another permutation, then there is another permutation $\sigma^{-1}$, and the property is that if the permutation s followed by the permutation $\sigma^{-1}$, then the original list is recovered. It is also important to note that if $\sigma^n$ is a permutation that is obtained by applying the permutation n separate times, that $(\sigma^{-1})^n = \sigma^{-n}$ is its inverse.

There have been implementations of transaction security systems that have a human making a decision whether the document holder and the image of the document holder match. While it is commonly accepted that humans outperform any automatic-face-verification systems built to date, there is often a reluctance to impose a human as a decision point. As an example, a young store clerk might not wish to be the critical decision point when confronted by a physically dominating thief. A means to circumvent this is to have a machine make the decision. A means of performing this decision is by a face detection algorithm as part of the transaction processing system. Consequently, another feature of the present invention is the use of face detection.

Face detection should not be confused with face recognition, as face detection refers to the ability of a computer to identify the presence and location of a human face within an image. Whereas, face recognition has the task of identifying the name of the person whose face is displayed. There are many face detection algorithms that could be utilized for this purpose, (see Erik Hjelmas and Boom Kee Low, "Face Detection: A Survey," Computer Vision and Image Understanding, Volume 83, Number 3, September, 2001, pp. 236–274 and M-S. Yang, D. J. Kreigman, and N. Ahuja, "Detecting Faces in Images: A Survey," IEEE Transactions in Pattern Analysis and Machine Intelligence, Volume 24, Number 1, January, 2002, pp. 34–58). These algorithms have different performance capabilities and are based upon various assumptions. Typical assumptions are that the face is face forward and oriented in the upright position. For the present invention these are easily complied with. A more important criteria for the present invention is processing speed and the rate of false negatives. Current face detection algorithms can attain satisfactory performances in both regards. However, the invention is not dependent upon the particular face detection algorithm, and as improved algorithms emerge, they can be readily deployed within the scope of the present invention.

SUMMARY OF THE INVENTION

The present invention is directed to overcoming one or more of the problems set forth above. Briefly summarized, according to one aspect of the present invention, the present invention includes a method for authenticating a transaction document based upon an image contained within the document, the method comprising the steps of compressing an image; scrambling the structure of the compressed image according to a permutation; embedding the scrambled compressed image on the document; obtaining the inverse permutation; applying the inverse permutation to the scrambled image for obtaining an unscrambled image; and decompressing the unscrambled image.

These and other aspects, objects, features and advantages of the present invention will be more clearly understood and appreciated from a review of the following detailed description of the preferred embodiments and appended claims, and by reference to the accompanying drawings.

Advantageous Effect of the Invention

The present invention has the advantage of identifying potential fraudulent transaction documents without human intervention. The present invention also has the advantage of storing the inverse or decoding permutation in a plurality of convenient places.

DETAILED DESCRIPTION OF THE INVENTION

In the following description, the present invention will be described in the preferred embodiment as a software program. Those skilled in the art will readily recognize that the equivalent of such software may also be constructed in hardware.

It is also understood that components described herein, such as, but not limited to, an encoder and decoder, may be a portion of a computer system which components are well known in the art and will not be described in detail herein.

Figure 1:
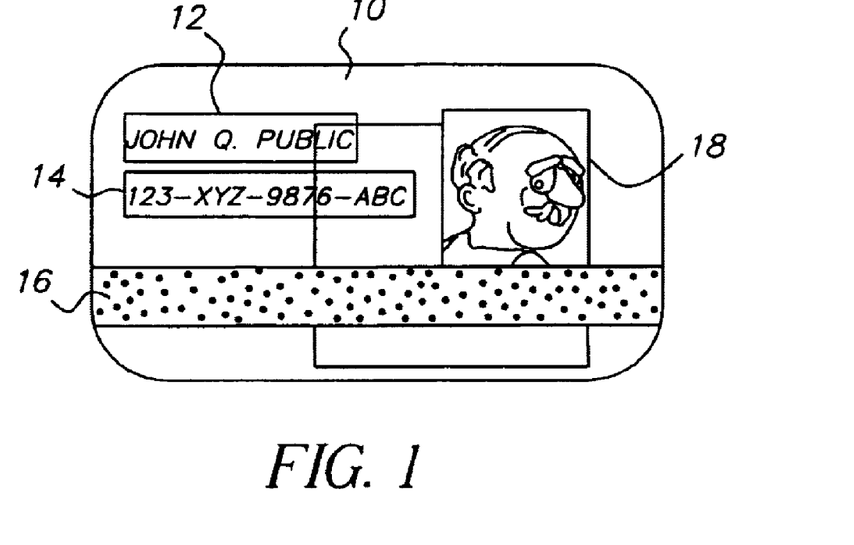
FIG. 1 is a drawing of a typical transaction document.

Referring to FIG. 1, a transaction document 10 is a means of acquiring services or products and can be comprised of many components and not all components may appear within any given transaction document. However, it is typical for a transaction document to have the name of the authorized document holder 12, account number or control number 14, an area with machine readable content 16, and an image of the authorized document holder 18. The machine-readable area comes in many forms including magnetic stripes, one or two-dimensional bar codes, integrated circuits, and data glyphs. Within the machine-readable area is information pertinent to the transaction document. In all but the one-dimensional bar code, it is possible to encode and store an image of the authorized holder of the transaction document.

Figure 2:
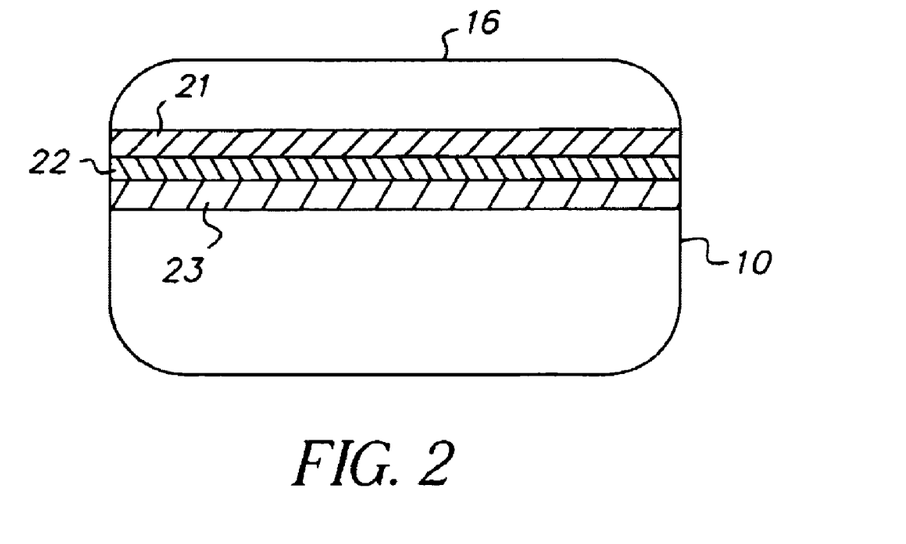
FIG. 2 is a detailed drawing of the magnetic strip on the transaction document.

Referring to FIG. 2, in the case of a standard magnetic credit card 10, the machine-readable area 16 is comprised of two or three magnetic tracks 21,22, and 23. Information stored on track one, 21, is the name of the authorized document holder, and track two, 22, may store the account number of the authorized transaction document holder. Sometimes on track three 23, there may be a digitally encoded image of the document holder. In the following, it is assumed that there exists a digitally encoded image within the transaction document. A means for encoding a portrait image, in the case of magnetic stripes, is a method based upon vector quantization. This method uses a database of image blocks that are referenced by an index number. Typically one byte is used for each index and the order of the indices is presumed by both the encoder and the decoder. For other approaches where more machine-readable data can be stored, a likely means of storing the image is by using JPEG or JPEG2000 compressed image format. JPEG is the current International Standard for compression of images. JPEG2000 is the next generation image compression standard that aims to provide better compression efficiency, especially at lower rates. JPEG is block-structured. JPEG2000, while not inherently block-structured, uses codeblocks that represent rectangular regions in the spatio-frequency domain. A JPEG or JPEG2000 decoder expects a certain order and arrangement of blocks in the compressed bit-stream as specified in the respective standard. Moreover, the data for each block also has a fixed ordering. If the data in the compressed bit-stream does not appear in the expected order, the image reconstructed from the data will appear quite different than expected. It will be obvious, even for the casual viewer, that the result does not correspond with either the image on the card or the transaction document holder.

Figure 3:
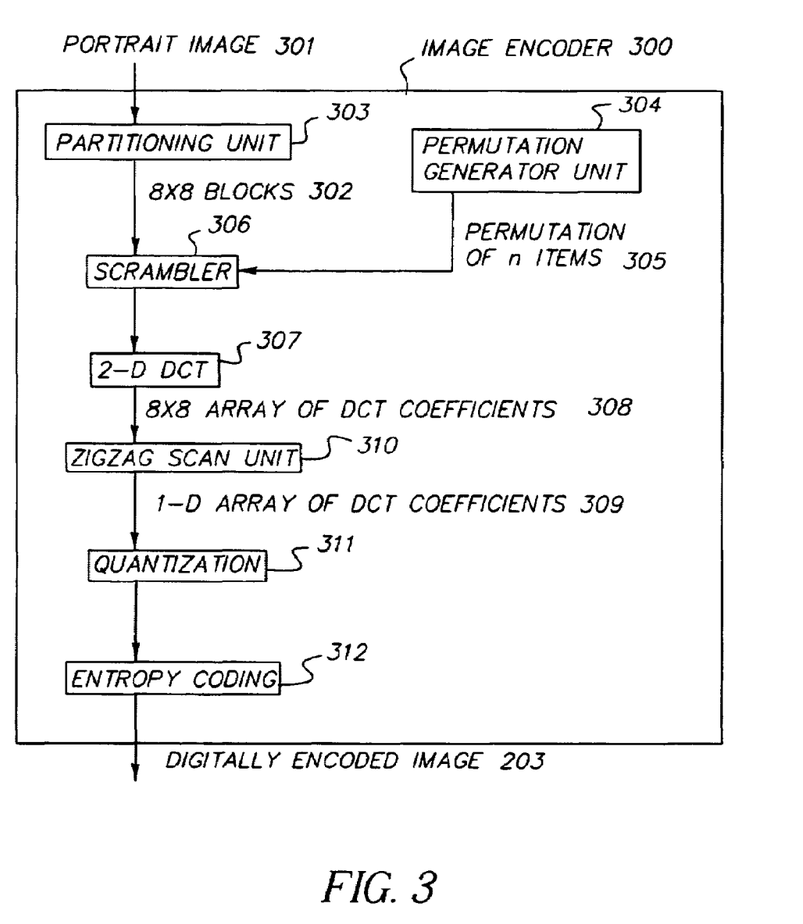
FIG. 3 is a the block diagram for an image encoder of the present invention.

FIG. 3 shows the block diagram for an image encoder 300 according to the present invention. In a preferred embodiment, the image encoder 300 uses JPEG compression to produce a digitally encoded image 203 that is stored in the machine-readable area 16 of a transaction document 10. Although the digitally encoded image 203 is in the JPEG format, the order in which 8×8 blocks from the image appear in the compressed bit-stream is scrambled. In this regard, a portrait image 301 is divided into 8×8 blocks 302 by a partitioning unit 303. The partitioning unit 303 arranges the 8×8 blocks 302 in a raster order. In a raster order, the blocks are ordered with a course to complete a horizontal strip, before a subsequent course is started. This is analogous to the way bricks are laid. A permutation generator unit 304 generates a permutation of n items 305. The ordering of a group of n successive 8×8 blocks coming out of the partitioning unit 303 is perturbed by a scrambler 306 according to the permutation of n items 305. This process is repeated for successive groups of n blocks. The permutation of n items 305 may be different for each group of n blocks, as described later. Each 8×8 block 302 is transformed using a two-dimensional (2-D) discrete cosine transform (DCT) 307 to produce an 8×8 array of DCT coefficients 308. The 2-D array of DCT coefficients 308 is converted into a one-dimensional (1-D) array 309 by the zigzag scan unit 310. The 1-D array of DCT coefficients 309 undergoes quantization 311 and entropy coding 312. The entropy coder 312 uses a combination of run-length and Huffman coding to produce a digitally encoded image 203.

Figure 4:
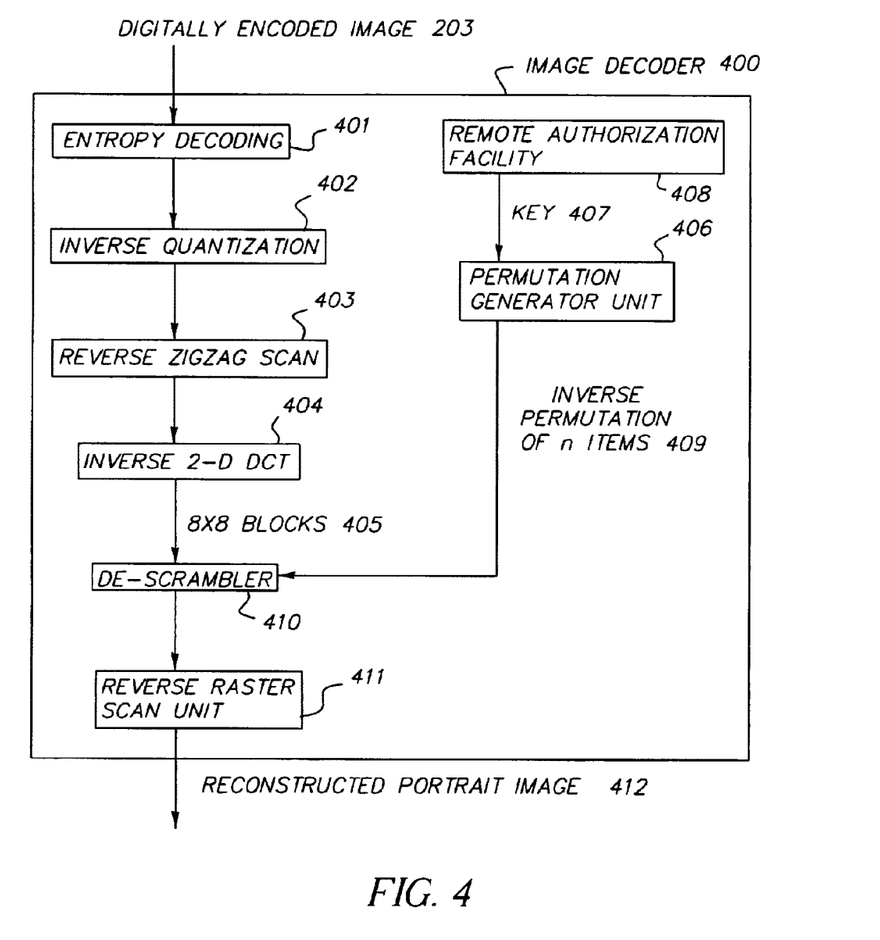
FIG. 4 is a block diagram of an image decoder according to the present invention.

FIG. 4 shows the block diagram of an image decoder 400 according to the present invention. The image decoder 400 reads a digitally encoded image 203 stored on the machine-readable area 16 of a transaction document 10 and generates a reconstructed portrait image 412. Each 8×8 block in the digitally encoded image 203 undergoes entropy decoding 401, inverse quantization 402, reverse zigzag scan 403 and inverse 2-D DCT 404 to produce an 8×8 block 405 in the image domain. All of these are well known in the art and will not be discussed in detail herein. A permutation generator unit 406 uses a key 407 received from a central, remote authorization facility 408 to generate an inverse permutation of n items 409. The ordering of a group of n successive 8×8 blocks is perturbed by a de-scrambler 410. This process is repeated for successive groups of n blocks. The inverse permutation of n items 409 may be different for each group of n blocks but is synchronized with the image encoder 300 in such a way that the combined operation of scrambling and de-scrambling restores the original raster order by the reverse raster scan unit 411 of the 8×8 blocks 302 coming out of the partitioning unit 303.

Figure 5:
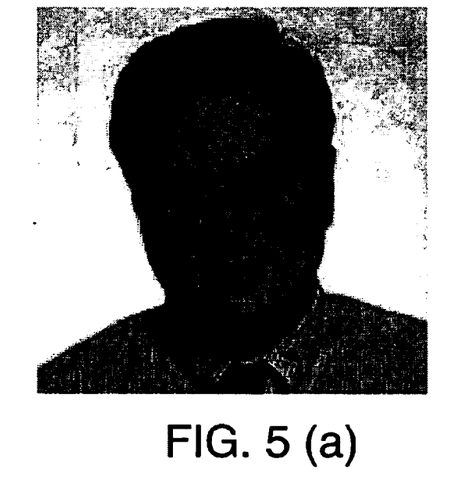
FIG. 5a is drawing of an original portrait.
FIG. 5b is a reconstructed image of the original image having wrong spatial placement of the blocks of the image.

If the ordering of the blocks in a digitally encoded image has been altered in any way, an array of 8×8 blocks would still be produced by the 2-D inverse DCT. But, the descrambling operation would not restore the original raster order of the 8×8 blocks. Examples of such alterations are when the original portrait image in the transaction document is fraudulently replaced by another portrait image, but the block order is not scrambled or scrambled incorrectly before applying JPEG compression to each 8×8 block. In such a case, and referring to FIG. 5b, the portrait image will be reconstructed with 8×8 blocks in the wrong spatial locations, as compared with the original portrait image is shown in FIG. 5a. The image blocks have been shifted according to one embodiment of the invention and the image is reconstructed (FIG. 5b) without the proper reverse process. In such a case, even an untrained observer can immediately infer that the portrait image has been fraudulently altered. Alternatively, if the requirement that a human determine if the image has been altered is not acceptable, then a face detection algorithm may be applied to locate a face in the unscrambled image. There are many face detection algorithms that could be utilized for this purpose, (see Erik Hjelmas and Boom Kee Low, "Face Detection: A Survey," Computer Vision and Image Understanding, Volume 83, Number 3, September, 2001, pp. 236–274 and M-S. Yang, D. J. Kreigman, and N. Ahuja, "Detecting Faces in Images: A Survey," IEEE Transactions in Pattern Analysis and Machine Intelligence, Volume 24, Number 1, January, 2002, pp. 34–58). If no face is detected, then it is inferred that the digitally encoded image has been altered in some way. Alternatively, an operator can observe the unscrambled image and make a determination that the image is a face and then if the face matches the transaction document holder.

The advantage of this method is that the size of the compressed file remains the same. This is because the compressed bit-stream corresponding to each 8×8 block is the same. Only the order in which the blocks appear in the compressed file is altered. Those skilled in the art will recognize that the concept of scrambling the ordering of the 8×8 blocks can be applied to any block-based compression algorithm. For example, instead of performing JPEG compression on the 8×8 blocks, vector quantization may be used for compression. The incorrect scrambling of the block order will still result in an image reconstructed with blocks in the wrong spatial locations.

Figure 6:
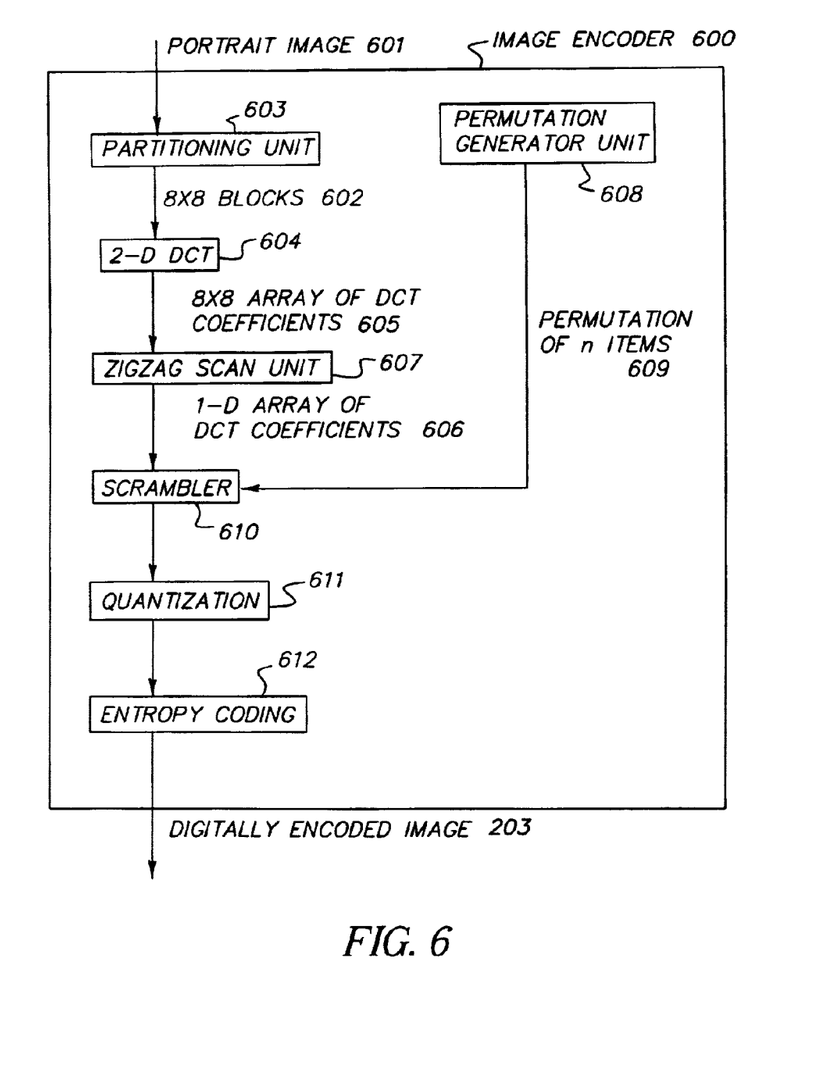
FIG. 6 is an alternative embodiment of the image encoder.

Instead of scrambling the ordering of n blocks, it is possible to scramble the ordering of n DCT coefficients within each 8×8 block. The DCT coefficient corresponding to the lowest spatial frequency in the horizontal and vertical direction is known as the DC coefficient. The rest of the DCT coefficients are known as AC coefficients. The zigzag scan arranges the DCT coefficients in such a manner that the DC coefficient appears first, and the AC coefficients follow the DC coefficient in the increasing order of spatial frequency. The ordering of the first n coefficients from the zigzag scan may be scrambled using a permutation of n items. FIG. 6 shows another embodiment of the image encoder 600 based on this idea.

In this regard, a portrait image 601 is divided into 8×8 blocks 602 by a partitioning unit 603. The partitioning unit 603 arranges the 8×8 blocks 602 in a raster order. Each 8×8 block 602 is transformed using a two-dimensional (2-D) discrete cosine transform (DCT) 604 to produce an 8×8 array of DCT coefficients 605. The 2-D array of DCT coefficients 604 is converted into a one-dimensional (1-D) array of DCT coefficients 606 by a zigzag scan unit 607. A permutation generator unit 608 generates a permutation of n items 609. The ordering of the first n DCT coefficients from the 1-D array 606 is perturbed by the by a scrambler 610 according to the permutation of n items 609. The permutation of n items 609 may be different for each block. The scrambled 1-D array of DCT coefficients undergoes quantization 611 and entropy coding 612 to produce a digitally encoded image 203.

Figure 7:
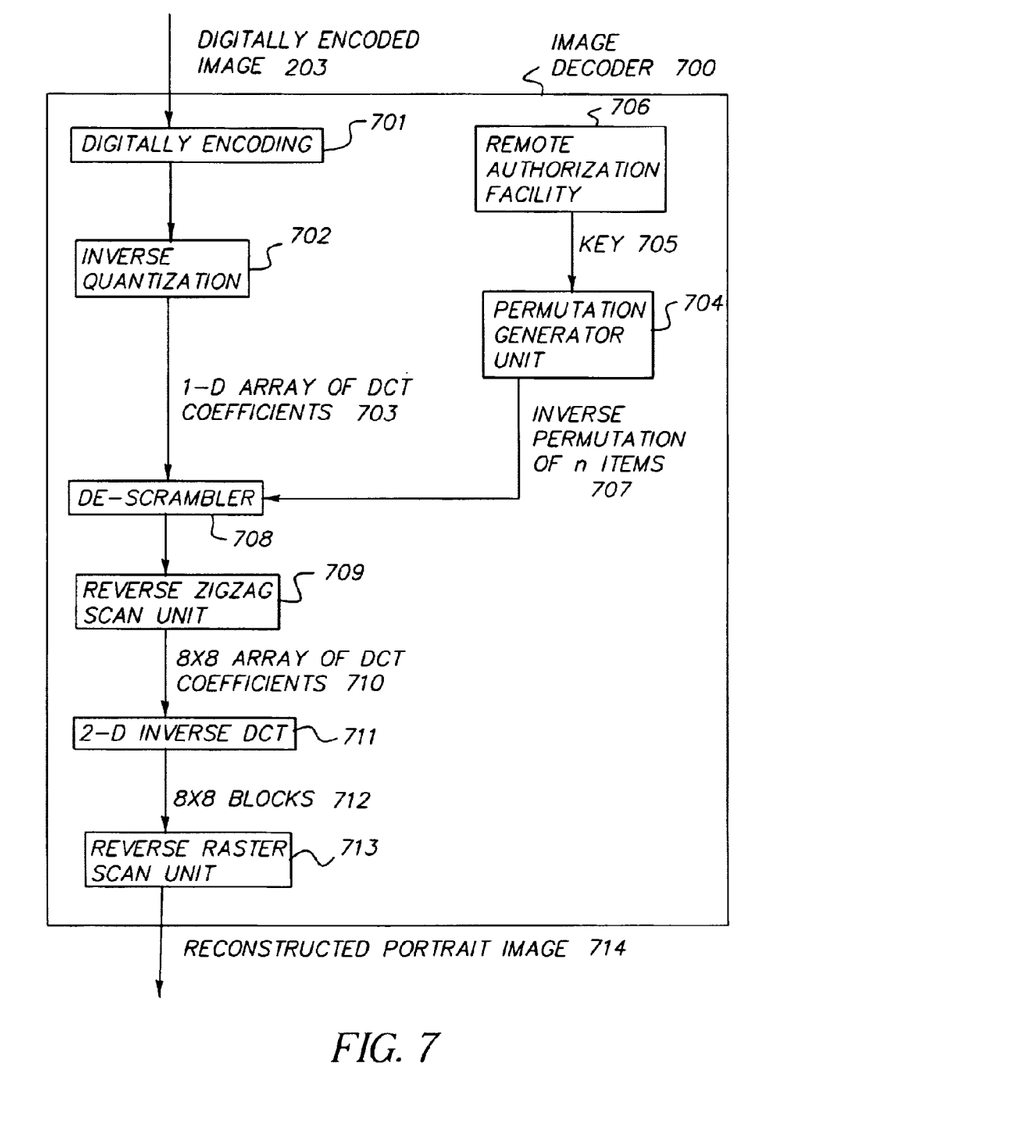
FIG. 7 is a block diagram of an image decoder used to decode for the encoder of FIG. 6.

FIG. 7 shows the block diagram of another embodiment of an image decoder 700 used to decode a digitally encoded image 203 produced by the image encoder 600 shown in FIG. 6. Each 8×8 block in the digitally encoded image 203 undergoes entropy decoding 701 and inverse quantization 702 to produce a one-dimensional (1-D) array of DCT coefficients 703. A permutation generator unit 704 uses a key 705 received from a central, remote authorization facility 706 to generate an inverse permutation of n items 707. The ordering of the first n coefficients from the 1-D array 703 is perturbed by a de-scrambler 708 according to the inverse permutation of n items 707. This process is repeated for each 8×8 block. The unscrambled coefficients are transformed from a linear array into a two-dimensional array 710 in a zigzag pattern by the reverse zigzag unit 709. This is done for each 8×8 image block in the digitally encoded image 203. The image blocks are now in a structure anticipated by the decompression method, a 2-D inverse DCT 711. The decompression method restores an 8×8 pixel block of the image 712. The set of image blocks are then used to restore the image into a raster scanned image by the reverse raster scan unit 713. The result of the reverse raster scan unit 713 is a reconstructed portrait image 714. These last steps are typical of the approach used by the DCT decompression unit and are not specific to the scrambling and unscrambling of the coefficients. While it is easier to envision the system using a common permutation for each block, this is not intended to be a limiting feature. Indeed, the inverse permutation of n items 707 may be different for each block (as described below). However, it is synchronized with the image encoder 600 in such a way that the combined operation of scrambling and de-scrambling the first n DCT coefficients of each block restores the original zigzag order of the DCT coefficients.

Figure 8:
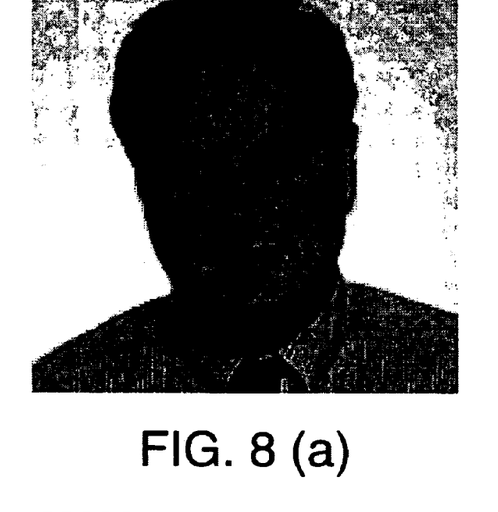
FIG. 8a is a drawing of a typical properly reconstructed image.
FIG. 8b is a typical image not properly reconstructed.

If the digitally encoded image has not been produced by the image encoder 600, the descrambling operation will not restore the original zigzag order of the DCT coefficients. For example, suppose that the original digitally encoded image in the transaction document is fraudulently replaced by another digitally encoded image, and the order of the DCT coefficients is not scrambled or scrambled incorrectly. Then, an incorrect set of DCT coefficients is input to the inverse 2-D DCT resulting in a reconstructed image that is quite corrupted as shown in FIG. 8b. As shown in FIG. 8a, an original image is shown which is compressed and decompressed according to the normal compression methods. The reconstructed image is clearly identifiable as a human face and the identity of the person could be readily as certained. If the image has the coefficients scrambled according to the method described above and reconstructed without the proper reverse process, then the reconstructed image (FIG. 8b) is unrecognizable event o a casual observer. Moreover, when this image is input to a face detection algorithm, the algorithm does not recognize the presence of a face. However, the same algorithm easily found a face in FIG. 8a. The artifacts are severe enough so that even an untrained observer can immediately infer that the portrait image has been fraudulently altered.

As natural images are inherently low-pass, low frequency DCT coefficients have higher magnitudes compared to higher frequency DCT coefficients. Also, the DCT coefficients appearing earlier in the zigzag scan (low spatial frequencies) are typically quantized using a smaller step-size compared to the DCT coefficients appearing later in the scan (high spatial frequencies). Due to coarser quantization and lower magnitudes, the higher frequency DCT coefficients are more likely to be quantized to zero. The entropy coder has the capability to exploit this by coding runs of zeros and using an 'end of block' symbol signifying that all the AC coefficients of a block following a certain non-zero AC coefficient are zero. But after perturbation, this capability may be weakened. For example, a low frequency AC coefficient may appear towards the end of the zigzag scan, breaking a run of zeros and/or making the 'end of block' symbol less efficient. This can result in a large increase in the compressed file size. To avoid this, in a preferred embodiment, the order perturbation is applied only to the first 16 DCT coefficients from each block. The block with perturbed DCT coefficients still represents a valid DCT block.

In a preferred embodiment, the order perturbation is applied to the first 16 DCT coefficients in the zigzag scan. But, perturbing the first 16 DCT coefficients may result in a substantial increase in the size of the JPEG compressed file. This is because, in JPEG compression, the DC coefficient is differentially encoded to exploit the high degree of correlation between the DC coefficients from neighboring blocks. When the DCT coefficient ordering is perturbed, this property may not be true for the AC coefficient that replaces the DC coefficient. If the increase in the size of the compressed JPEG file is unacceptable, the order perturbation may be applied only to the first 16 AC coefficients. This results in a smaller increase in the JPEG compressed file size. At the same time, the artifacts in the image reconstructed without applying the inverse permutation are less severe.

It is now instructive to discuss the generation of a permutation of n items in greater detail. A permutation of n items can be expressed as an n dimensional vector. For a mathematical treatment of permutation, please refer to Algebra by Lang or any standard text on group theory. One property of the permutation vector is that it contains all the integers from 1 to n, but in a different order. Since the dimension of the vector is n, it is obvious that no integer is repeated. Consider the following permutation of 4 items: σ=[4, 1, 2, 3]. Suppose we want to use this permutation vector to change the ordering of the first 4 DCT coefficients in the zigzag scan represented by d=[16.9, 2.3, 7.1, 1.5]. Let the result of this operation be denoted by σ(d). The ordering of the elements of d is perturbed as follows. The $i^{th}$ element of the permutation vector σ represents the position of $i^{th}$ element of vector d after perturbation. For example, the $3^{rd}$ element of the permutation vector σ is 2. This means that after perturbation, the $3^{rd}$ element of the DCT coefficient vector d (7.1) will become the $2^{nd}$ element of the vector σ(d). Thus, σ(d)=[2.3, 7.1, 1.5, 16.9]. In this example, the permutation vector was used to perturb the first n DCT coefficients of a block. In a similar manner, the permutation vector can be used to perturb the ordering of a group of n blocks.

There are n!=n(n−1)(n−2) . . . 3 2 1 unique permutations of n items. Thus, for a permutation of 16 items, there are 16!~2×10^13 unique permutations. A number sufficiently large for a unique permutation for each card assuming a worldwide population of 10 billion and every person having 200 cards, an unlikely event. The central facility communicates the permutation associated with a particular transaction document to the image decoder. For a permutation of 16 items, each element can be represented with 4 bits. Thus, the central facility needs to send only 64 bits to the image decoder to specify a unique permutation. To reduce the number of bits, in another embodiment, a large number of permutation vectors, say 1024, are stored in a look-up table at the image decoder. The image encoder uses one of the permutation vectors stored in the look-up table to perturb the ordering of DCT coefficients or group of blocks. The central facility sends the index of the permutation vector in the look-up table (10 bits). In both cases, the image decoder calculates the inverse permutation needed to restore the original ordering. Let the inverse permutation be denoted by $\sigma^{-1}$. Then, $\sigma^{-1}\sigma(d)=d$. For σ=[4, 1, 2, 3], $\sigma^{-1}$=[2, 3, 4, 1]. The elements of σ and $\sigma^{-1}$ are related as follows. Let $\sigma_i$=k, then $$\sigma_k^{-1} = i.$$

Consider the case of perturbation of ordering of n blocks using a permutation vector of n items. In order to accommodate variable number of blocks in an image a permutation of n elements can be applied repeatedly. If the total number of blocks used by the JPEG algorithm is m and the permutation is among n elements, then m=pn+r, where p is the number of integral multiples of m and r is the remainder. Then the permutation is applied to each set of n blocks successively and no permutation is applied to the last r blocks. But repeating the permutation has the disadvantage that it may be possible to guess the manner in which the blocks are scrambled. To overcome this, in a preferred embodiment, a set of permutations is generated algorithmically starting with the initial permutation Consider a permutation of n items, σ. Now if the ordering of the elements of vector d is permuted twice, each time using the permutation vector σ, then the resulting vector is σ(σ(d)). This operation is denoted by $\sigma^2$. For example, when σ=[4, 1, 2, 3], $\sigma^2$=[3, 4, 1, 2]. The operation $\sigma^2$ is itself a permutation. By continuing this approach a set of permutations is determined algorithmically. When the ordering of first 16 DCT coefficients of each block is being perturbed, the first block is perturbed using the permutation vector σ, the second block is perturbed using the permutation vector $\sigma^2$, and so on. Similarly if the ordering of a group of n blocks is being perturbed, the first group is perturbed using the permutation vector σ, the second block is perturbed using the permutation vector σ², and so on. In mathematical terms, the set of permutations is a group and using the aforementioned method results in the generation of a subgroup. Each element of the subgroup is itself a permutation. By applying the set of permutations to the data, the appearance of a regular pattern disappears. However, all that is required to derive the set the permutations is the initial permutation.

A more mathematically complete description follows. If a permutation μ, a second permutation can easily be formed, μ², and consequently a series of permutations are easily formed where each permutation in the series differs from its predecessor. Indeed, the series μ, μ², μ³, μ⁴, . . . is such a series. Since the number of permutations of n times is finite, there is a point where the series repeats and a cycle of permutations is formed. The length of this cycle, referred to the order of the permutation, depends upon the permutation. For the identity permutation, the order is one, but this is the only permutation with this property. Similarly, the series of inverse permutations is easily determined given the inverse of the initial permutation. Indeed, the series is μ⁻¹, μ⁻², μ⁻³, μ⁻⁴, . . . , μ⁻ⁿ, . . . . Consequently, a simple means to generate a series of permutations that is different at each subsequent block is created, as well as the means to undo the effect of the permutation. This series only requires the initial or seed permutation.

Once the permutation is received the inverse permutation is applied to the block structure and the resulting descrambled image is posted for the clerk to observe. In the case where each block has a permutation that differs from the permutation of the previous block, the inverse for that block is determined with the same set of operations. For instance if the $n^{th}$ permutation is σⁿ, then the inverse is $(\sigma^{-1})^n$. After applying the inverse permutation to affect an unscrambling of the data, the decompression algorithm is applied and an image, the unscrambled image, results. An operator can observe the unscrambled image and make a determination that the image is a face and then if the face matches the transaction document holder. One advantage of this method is that the size of the JPEG file remains the same irrespective of the permutation that is used to scramble the block structure. This is because, the compressed bit-stream corresponding to each block does not change, only their order of appearance in the JPEG file changes.

Alternatively, a face detection algorithm is applied to locate a face in the unscrambled image. If a face is detected, then the transaction completes. Since the image is contained in the processing device it is practical to input the output from the decompression algorithm directly in to the face detection algorithm. This removes a human from the verification process. Another practical aspect of such a process, is that prior to issuing the transaction document, it can be verified that the face encoded in the document will be detected by the face detection algorithm. This would greatly reduce, if not eliminate, the potential problem of a valid face not being detected by the algorithm at the time of a transaction.

Another embodiment of the present invention includes embedding the permutation as a steganographic embedded code. This embodiment requires a scanning card reader, but does not require a remote access to a central facility. The permutation is embedded into a steganographic packet contained within the portrait printed on the document. Steganography is well known in the art and will not be discussed in detail herein. In this embodiment, the portrait of the user contains the information needed to unscramble the compressed image. This prevents an image of a person from being fraudulently imprinted on a card with other identification, i.e., imaging information. Consequently, if a transaction document has been altered by the replacing the proper image with a copied image, the verification process will continue to operate properly and not accept the tampered document. Moreover, one advantage of this approach is that there is no requirement for the inverse permutation to be transmitted to the transaction site. Thus concerns over communication bandwidth are mitigated.

Another approach is for the image of the authorized document holder to contain a digital watermark. When the document is presented the image is scanned and the watermark is extracted along with its data payload. The machine-readable portion of the document, containing a digitally encoded image of the document holder is read. It is assumed that the image portion of the data is stored in block form, such as with JPEG. It is also assumed there is some identifying number such as an account number, control number or serial number also included in the machine-readable area. This number is used as an index to a block number within the digitally encoded image. For instance, use the last two digits of this number to obtain one of one hundred possible blocks. The data for this block is recovered and is intended to match the data contained in the watermarked payload.

Figure 9:
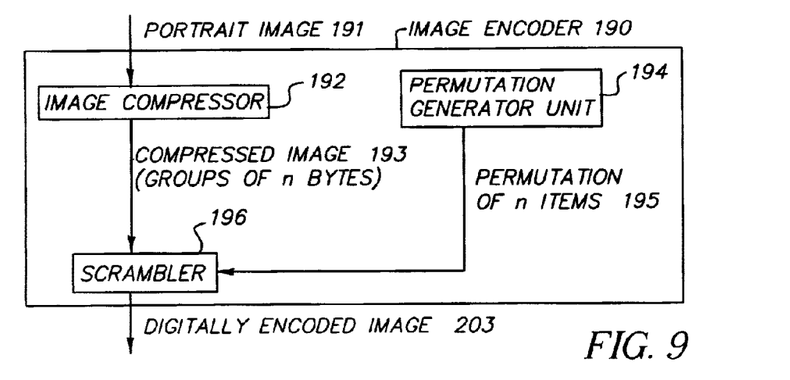
FIG. 9 is an alternative embodiment of the encoder of the present invention.

In another embodiment of the invention, the JPEG compression algorithm is replaced by JPEG2000 for compression of the portrait image. JPEG2000, as described in Information Technology—JPEG2000 Image Coding System, ISO/IEC International Standard 15444-1, ITU Recommendation T.800, 2000, is the next generation image compression standard. JPEG2000 is not block-based, but it uses codeblocks that represent rectangular regions in the spatio-frequency domain. JPEG2000 applies wavelet transformation to the input image to produce subbands. Subbands consist of wavelet coefficients. The wavelet coefficients are partitioned into different structures such as codeblocks and precincts. FIG. 9 shows an example of partitioning of the wavelet coefficients. Ordinarily, the JPEG2000 decoder expects the codeblocks from different subbands to appear in a certain order in the compressed bit-stream. The effect of the permutation of block ordering in the JPEG system can be reproduced in a JPEG2000 system as follows. Let the nominal codeblock size be 64×64 and let the codeblocks be arranged in the same order in which they would appear in the compressed bit-stream. First all codeblocks that have a size different from the nominal codeblock size are excluded from reordering. Then, the permutation of n elements is applied to the first n codeblocks of size 64×64 to scramble their ordering. This process is repeated for the next n codeblocks of size 64×64 and so on. As described previously in the context of a JPEG system, instead of applying the same permutation σ repeatedly, the successive permutations may be σ, σ², σ³ and so on, to make it more difficult to unscramble the ordering.

In JPEG2000, each codeblock is divided into stripes. Each stripe contains 4 rows of the codeblock. Consider a codeblock of size 64×64. It contains 16 stripes, which are processed starting with the topmost stripe and proceeding downwards. The ordering of the stripes in each 64×64 codeblock can be perturbed by using a permutation vector σ of length 16. As before, the image decoder applies inverse permutation before proceeding with entropy decoding.

Another embodiment of an image encoder according to the present invention is shown in FIG. 9. The image compressor 192 compresses the portrait image 191 to produce a compressed image 193. A permutation generator unit 194 generates a permutation of n items 195. Then, the scrambler 196 perturbs the ordering of the each group of n bytes from the compressed image 192 using the permutation of n items 195 to produce a digitally encoded image 203. As discussed earlier, the permutations applied to successive groups of n bytes may be $\sigma$, $\sigma^2$, $\sigma^3$ and so on.

Figure 10:
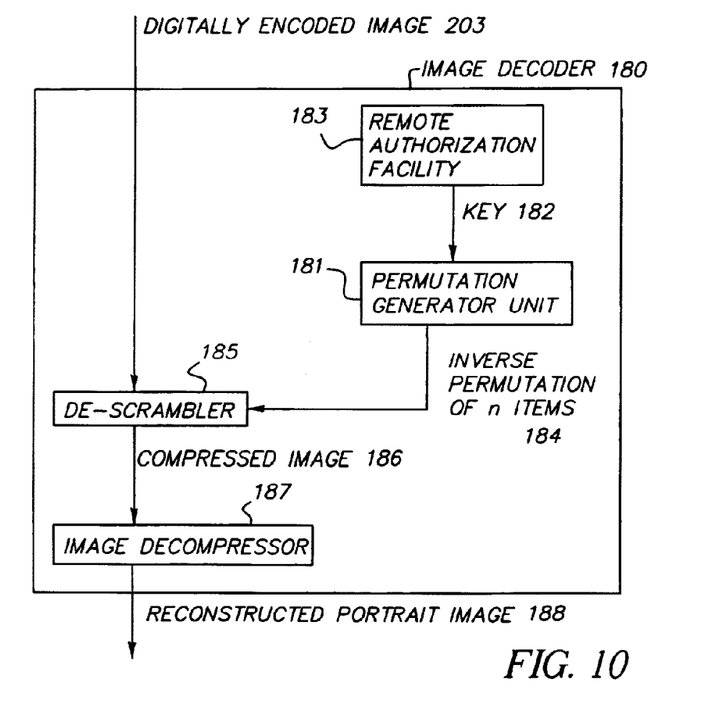
FIG. 10 is an alternative embodiment of the decoder of the present invention.

FIG. 10 shows the block diagram another embodiment of an image decoder 180 used to decode a digitally encoded image 203 produced by the image encoder 190 shown in FIG. 9. A permutation generator unit 181 uses a key 182 received from a central, remote authorization facility 183 to generate an inverse permutation of n items 184. The ordering of each group of n bytes from the digitally encoded image 203 is perturbed by a de-scrambler 185 according to the inverse permutation of n items 184. The inverse permutation of n items 184 may be different for each group but is synchronized with the image encoder 190 in such a way that the combined operation of scrambling and de-scrambling restores the compressed image 186. An image decompressor 187 decompresses the compressed image 186 to produce a reconstructed portrait image 188.

It is should be recognized that the methods of this disclosure extend to any image compression method that stores data along with an implicit understanding of the order of data. Such an example is vector quantization. The ordering of code values imply the ordering of the placement of the blocks within the image. By organizing a set of blocks and applying a permutation to each set will result in a similar distortion of the image making it visually corrupted, though the data is still semantically correct.

The invention has been described with reference to a preferred embodiment. However, it will be appreciated that variations and modifications can be effected by a person of ordinary skill in the art without departing from the scope of the invention.

Parts List

10 Transaction document
12 Authorized document holder
14 Account number or control number
16 Machine readable content or area
18 Image of authorized document holder
21 Magnetic track one
22 Magnetic track two
23 Magnetic track three
180 Image decoder
181 Permutation generator unit
182 Key
183 Central, remote authorization facility
184 Inverse permutation of n items
185 De-scrambler
186 Compressed image
187 Image decompressor
188 Reconstructed portrait image
190 Image encoder
191 Portrait image
192 Image compressor
193 Compressed image
194 Permutation generator unit
195 Permutation of n item
196 Scrambler
203 Digitally encoded image
300 Image encoder
301 Portrait image
302 8×8 blocks
303 Partitioning unit
304 Permutation generator unit
305 Permutation of n items
306 Scrambler
307 Two-dimensional (2-D) discrete cosine transform (DCT)
308 8×8 array of DCT coefficients
309 One-dimensional (1-D) array of DCT coefficients
310 Zigzag scan unit
311 Quantization
312 Entropy coding
400 Image decoder
401 Entropy decoding
402 Inverse quantization
403 Reverse zigzag scan
404 Inverse 2-D DCT
405 8×8 blocks
406 Permutation generator unit
407 Key
408 Central, remote authorization facility
409 Inverse permutation of n items
410 De-scrambler
411 Reverse raster scan unit
412 Reconstructed portrait image
600 Image encoder
601 Portrait image
602 8×8 blocks
603 Partitioning unit
604 Two-dimensional (2-D) discrete cosine transform (DCT)
605 8×8 array of DCT coefficients
606 one-dimensional (1-D) array of DCT coefficients
607 Zigzag scan unit
608 Permutation generator unit
609 Permutation of n items
610 Scrambler
611 Quantization
612 Entropy coding
700 Image decoder
701 Entropy decoding
702 Inverse quantization
703 One-dimensional (1-D) array of DCT coefficients
704 Permutation generator unit
705 Key
706 Central, remote authorization facility
707 Inverse permutation of n items
708 De-scrambler
709 Reverse zigzag scan unit
710 8×8 array of DCT
711 Two-dimensional (2-D) inverse discrete cosine transform (DCT)
712 8×8 blocks
713 Reverse raster scan unit
714 Reconstructed portrait image

What is claimed is:

1. A method for securely permitting a transaction based on a transaction document having an image contained within the document, the method comprising the steps of:
   a) compressing an image;
   b) scrambling sequential ordering of the structure of the compressed image according to a permutation to obtain a scrambled compressed image;
   c) embedding the scrambled compressed image on the document;
   d) obtaining the inverse permutation;
   e) applying the inverse permutation to the scrambled compressed image for obtaining an unscrambled compressed image; and
   f) decompressing the unscrambled compressed image.

2. The method as in claim 1 wherein step (d) includes obtaining the inverse permutation from steganographically embedded data in the transaction document.

3. The method as in claim 1 wherein step (d) includes obtaining the inverse permutation for the transaction document from a remote authorizing site.

4. The method as in claim 1 wherein step (d) includes obtaining the inverse permutation from a magnetic strip on the transaction document.

5. The method as in claim 1 wherein step (d) includes obtaining the inverse permutation from bar code data on the transaction document.

6. The method as in claim 1, wherein the image is a facial image.

7. The method as in claim 6 further comprising the step of applying a facial detection algorithm to the decompressed facial image for verifying presence of a human face.

8. The method as in claim 1 further comprising the step of partitioning the image into blocks, and each block includes a permutation derived from an initial permutation.

9. The method as in claim 8, wherein the derived permutation for the $n^{th}$ block is the initial permutation iterated n times.

10. The method as in claim 1, wherein the structure of the compressed image is a set of image blocks and each image block contains a reformatted subsequent structure, and the ordering of the reformatted subsequent structure is scrambled.

11. The method as in claim 1, wherein the structure of the compressed image is a set of image blocks and the ordering of the blocks is scrambled.

12. The method as in claim 1 further comprising the step of verifying authenticity of the transaction document.

13. The method as in claim 1, wherein the inverse permutation is 64 bits in length.

14. The method as in claim 1, wherein the inverse permutation is stored in a look-up table.

15. The method as in claim 14, wherein the inverse permutation is coded based on the look-up table.

16. A computer system for securely transacting a transaction based on a transaction document having an image contained within the document, the computer system comprising:
  a) a compressor for compressing an image on the document;
  b) a scrambler for scrambling sequential ordering of the structure of the compressed image according to a permutation to obtain a scrambled compressed image;
  c) a receiver for obtaining the inverse permutation;
  d) a descrambler for applying the inverse permutation to the scrambled compressed image for obtaining an unscrambled compressed image; and
  e) a decompressor for decompressing the unscrambled compressed image.

17. The computer system as in claim 16, wherein the receiver includes a mechanism for obtaining the inverse permutation from steganographically embedded data in the transaction document.

18. The computer system as in claim 16, wherein the receiver includes a mechanism for obtaining the inverse permutation for the transaction document from a remote authorizing site.

19. The computer system as in claim 16, wherein the receiver includes a mechanism for obtaining the inverse permutation from a magnetic strip on the transaction document.

20. The computer system as in claim 16, wherein the receiver includes a mechanism for obtaining the inverse permutation from bar code data on the transaction document.

21. The computer system as in claim 16, wherein the image is a facial image.

22. The computer system as in claim 21 further comprising the step of applying a facial detection algorithm to the decompressed facial image for verifying presence of a human face.

23. The computer system as in claim 16 further comprising a partitioner for partitioning the image into blocks, and each block includes a permutation derived from an initial permutation.

24. The computer system as in claim 23 further comprising a mechanism for iterating the initial permutation n times for the derived permutation for the $n^{th}$ block.

25. The computer system as in claim 16, wherein the structure of the compressed image is a set of image blocks and each image block contains a reformatted subsequent structure, and the ordering of the reformatted subsequent structure is scrambled.

26. The computer system as in claim 16 wherein the structure of the compressed image is a set of image blocks and the ordering of the blocks is scrambled.

27. The computer system as in claim 16 further comprising a verifier for verifying authenticity of the transaction document.

28. The computer system as in claim 16, wherein the inverse permutation is 64 bits in length.

29. The computer system as in claim 16, wherein the inverse permutation is stored in a look-up table.

30. The computer system as in claim 29, wherein the inverse permutation is coded based on the look-up table.

31. A method for securely permitting a transaction based on a transaction document having an image contained within the document, the method comprising the steps of:
  a) compressing an image;
  b) scrambling a structure of the compressed image according to a permutation that determines scrambling of sequential ordering of the structure of the compressed image so that content of the scrambled compressed image, when decompressed, is humanly incomprehensible without unscrambling with an inverse permutation; and
  c) embedding the scrambled compressed image on the document.

32. The method as in claim 31 further comprising the step of partitioning the image into blocks, and each block includes a permutation derived from an initial permutation.

33. The method as in claim 32, wherein the derived permutation for the $n^{th}$ block is the initial permutation iterated n times.

34. The method as in claim 31, wherein the structure of the compressed image is a set of image blocks and each image block contains a reformatted subsequent structure, and the ordering of the reformatted subsequent structure is scrambled.

35. The method as in claim 31, wherein the structure of the compressed image is a set of image blocks and the ordering of the blocks is scrambled.

36. A method for securely permitting a transaction based on a transaction document having an image contained within the document, the method comprising the steps of:
  a) obtaining an inverse permutation;
  b) applying the inverse permutation to a scrambled compressed image that unscrambles sequential ordering of the structure of the compressed image so that content of the scrambled compressed image, when decompressed, is humanly comprehensible for obtaining an unscrambled image; and c) decompressing the unscrambled compressed image.

37. The method as in claim 36 wherein step (a) includes obtaining the inverse permutation from steganographically embedded data in the transaction document.

38. The method as in claim 36 wherein step (a) includes obtaining the inverse permutation for the transaction document from a remote authorizing site.

39. The method as in claim 36 wherein step (a) includes obtaining the inverse permutation from a magnetic strip on the transaction document.

40. The method as in claim 36 wherein step (a) includes obtaining the inverse permutation from bar code data on the transaction document.

41. The method as in claim 36, wherein the image is a facial image.

42. The method as in claim 41 further comprising the step of applying a facial detection algorithm to the decompressed facial image for verifying presence of a human face.

43. The method as in claim 36, wherein the inverse permutation is 64 bits in length.

44. The method as in claim 36, wherein the inverse permutation is stored in a look-up table.

45. The method as in claim 44, wherein the inverse permutation is coded based on the look-up table.

46. A computer system for securely permitting a transaction based on a transaction document having an image contained within the document, the computer system comprising:

a) a compressor for compressing an image on the document;

b) a scrambler for scrambling a structure of the compressed image according to a permutation that determines scrambling of a sequential ordering of the structure of the compressed image so that contents of the scrambled compressed image, when decompressed, is humanly incomprehensible without unscrambling with an inverse permutation; and c) an embedding apparatus for embedding the scrambled compressed image on the document.

47. The computer system as in claim 46 further comprising a partitioner for partitioning the image into blocks, and each block includes a permutation derived from an initial permutation.

48. The computer system as in claim 47 further comprising a mechanism for iterating the initial permutation n times for the derived permutation for the $n^{th}$ block.

49. The computer system as in claim 46, wherein the structure of the compressed image is a set of image blocks and each image block contains a reformatted subsequent structure, and the ordering of the reformatted subsequent structure is scrambled.

50. The computer system as in claim 46 wherein the structure of the compressed image is a set of image blocks and the ordering of the blocks is scrambled.

51. A computer system for securely permitting a transaction based on a transaction document having an image contained within the document, the computer system comprising:

a) a receiver for obtaining an inverse permutation;

b) a descrambler for applying the inverse permutation that descrambles sequential ordering of the structure of the compressed image so that contents of the scrambled compressed image, when decompressed, is humanly comprehensible for obtaining an unscrambled image; and c) a decompressor for decompressing the unscrambled compressed image.

52. The computer system as in claim 51, wherein the receiver includes a mechanism for obtaining the inverse permutation from steganographically embedded data in the transaction document.

53. The computer system as in claim 51, wherein the receiver includes a mechanism for obtaining the inverse permutation for the transaction document from a remote authorizing site.

54. The computer system as in claim 51, wherein the receiver includes a mechanism for obtaining the inverse permutation from a magnetic strip on the transaction document.

55. The computer system as in claim 51, wherein the receiver includes a mechanism for obtaining the inverse permutation from bar code data on the transaction document.

56. The computer system as in claim 51, wherein the image is a facial image.

57. The computer system as in claim 56 further comprising the step of applying a facial detection algorithm to the decompressed facial image for verifying presence of a human face.

58. The computer system as in claim 51, wherein the inverse permutation is 64 bits in length.

59. The computer system as in claim 51, wherein the inverse permutation is stored in a look-up table.

60. The computer system as in claim 59, wherein the inverse permutation is coded based on the look-up table.

* * * * *